Figure 1:
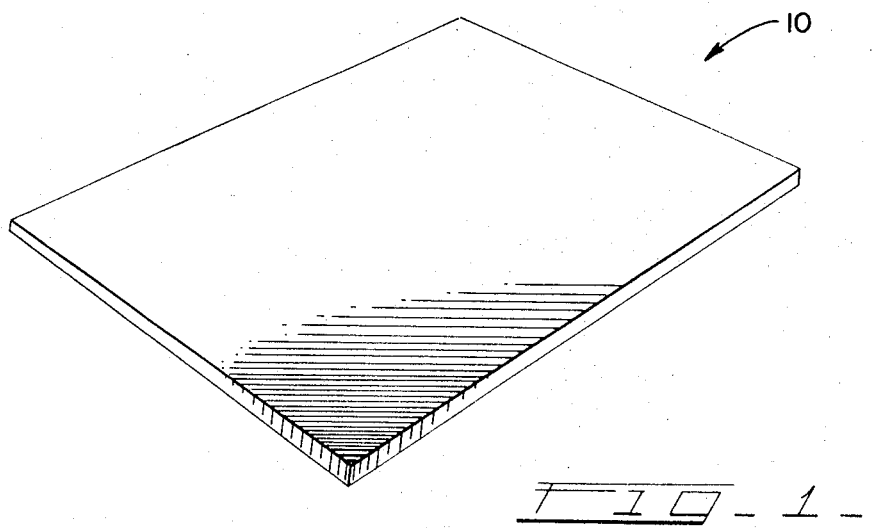

United States Patent

[11] 3,625,876

[72] Inventor Chester W. Fitko
 Chicago, Ill.
[21] Appl. No. 742,027
[22] Filed July 2, 1968
[45] Patented Dec. 7, 1971
[73] Assignee Continental Can Company, Inc.
 New York, N.Y.

[54] VINYLIDENE CHLORIDE POLYMER COATING COMPOSITION FOR THERMOPLASTIC FILMS
6 Claims, 2 Drawing Figs.

[52] U.S. Cl. .................................................. 260/23.7,
 99/171, 117/138.8, 117/161, 156/331, 161/253,
 260/23, 260/30.4, 260/31.2, 260/32.8, 260/33.4,
 260/33.6, 260/77.5, 260/891
[51] Int. Cl. .................................................. C08f 29/12
[50] Field of Search .......................................... 260/23.7 N,
 23 TN, 23 EP, 891, 23 X, 77.5 CR; 117/161 A,
 138.8 F; 99/171 LP

[56] References Cited
UNITED STATES PATENTS

| | | | |
|---|---|---|---|
| 2,658,052 | 11/1953 | Signer et al. ................... | 260/891 |
| 2,964,422 | 12/1960 | Bergstedt et al. .............. | 117/161 |
| 3,335,029 | 8/1967 | Holben ......................... | 117/138.8 |

Primary Examiner—Donald E. Czaja
Assistant Examiner—Donald J. Barrack
Attorneys—Paul Shapiro, Joseph E. Kerwin and William A. Dittmann ABSTRACT: A coating composition which has low gas transmission properties and is strongly adherent to thermoplastic film materials which comprises a solution in a volatile organic solvent of a vinylidene chloride polymer, a butadiene/acrylonitrile copolymer, an epoxidized unsaturated oil, an organic polyisocyanate and a free radical-producing catalyst.

PATENTED DEC 7 1971

3,625,876

INVENTOR
CHESTER W. FITKO
BY Paul Shapiro
ATT'Y.

VINYLIDENE CHLORIDE POLYMER COATING COMPOSITION FOR THERMOPLASTIC FILMS

BACKGROUND OF THE INVENTION

1. Field of Invention

The present invention relates to coating compositions, and more particularly, to vinylidene chloride polymer coating compositions for thermoplastic films.

2. The Prior Art

Flexible walled pouches or containers have been used with excellent results and to an increasing extent in the packaging art for preserving and distributing food stuffs and other materials of various character. These packages are generally constituted of flexible thermoplastic materials, such as polyolefin films, as polyethylene and the like, which are laminated to dissimilar thermoplastic films, such as polyethylene terephthalate. Flexible packages are formed from the laminated sheets by means of heat-sealing operations.

Laminated polyolefin/polyethylene terephthalate films are recognized as having substantial liquid impermeability and low-moisture vapor transmission values. However, the gas transmission value of the laminated film is so high that the film cannot be satisfactorily used for a number of purposes where it is eminently suited, were it not for this disability, namely, the food industry where, in the case of potato chips, cheese, and many other perishables which are affected by air, oxygen, $CO_2$, etc., rancidity or other undesirable chemical changes occur using packages formed from polyethylene/polyethylene terephthalate laminate films.

To lower the gas transmission value of the laminate, the polyolefin or polyethylene terephthalate ply of the laminate is generally coated with a thin layer of a vinylidene chloride polymer coating. The vinylidene chloride polymer coated ply is then joined by applying an adhesive to the uncoated side of the second ply of which the laminate is constructed. An adhesive is required for the film lamination, for polyolefin films have very poor adherence, either to uncoated polyethylene terephthalate film or to vinylidene chloride polymer coated polyethylene terephthalate. The separate application of a vinylidene chloride polymer coating to lower the gas transmission properties of the laminate, and the separate application of an adhesive to improve the bonding properties of the laminate plies, represents a costly and time-consuming sequence of processing steps, and hence, a commercial disadvantage.

SUMMARY OF THE INVENTION

In accordance with the present invention, there is provided a laminated sheet suitable for use as a flexible packaging film having a base of a thermoplastic film, a ply of a dissimilar thermoplastic film bonded to at least one face of the face film having an intermediate layer interposed therebetween, the intermediate layer being comprised of the cured product of a vinylidene chloride polymer, a butadiene/acrylonitrile copolymer, an epoxidized unsaturated oil, and an organic polyisocyanate.

The laminate film prepared in accordance with the present invention is possessed of a strong and effective bond between the film plies. With polyolefin/polyethylene terephthalate laminate plies prepared in this manner, in most instances, it is extremely difficult, if not impossible, to strip the polyolefin film from the surface of the polyethylene terephthalate film by ordinary physical methods.

Polyolefin/polyethylene terephthalate laminate films prepared in accordance with the present invention exhibit a low degree of permeability to gases such as $O_2$ and $CO_2$, excellent transparency, and excellent heat sealability which particularly suit them for use as packaging films.

THE DRAWINGS

Now referring more particularly to the drawings,

FIG. 1 perspectively depicts a laminated structure in accordance with the present invention.

Figure 2:
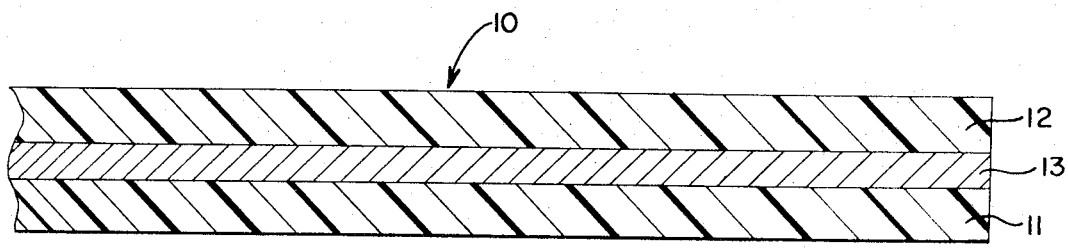

FIG. 2 illustrates the laminated structure of FIG. 1 in fragmentary cross section.

With reference to FIGS. 1 and 2, there is illustrated a laminated sheet of the present invention generally designated by the reference numeral 10. The laminated sheet 10 has a first or base layer 11 of a thermoplastic film such as polyethylene terephthalate film of suitable thickness. When polyethylene terephthalate films are used as the base layer to provide adequate dimensional stability and optimum barrier properties for the laminated sheet to be employed as a packaging material, it is desirable that the layer 11 have a thickness ranging from about 0.5 to about 10 mils, and preferably about 0.5 mils in thickness, although any other film thicknesses may be considered.

To the layer 11 is bonded a dissimilar thermoplastic film such as polyolefin layer 12 by an intermediate coextensive layer 13 comprised of a major amount of a vinylidene chloride polymer having incorporated therein a minor proportion of a mixture of a butadiene/acrylonitrile copolymer, an epoxidized unsaturated oil, and an organic polyisocyanate. The thickness of the intermediate layer 13 may range from about 0.25 to 2.0 mils, preferably 0.25 to 0.75 mils. When the film layer 12 is a polyolefin, the layer may range in thickness from about 0.5 to about 10 mils and preferably about 0.5 to about 1.5 mils.

PREFERRED EMBODIMENTS

The term "vinylidene chloride polymers" as used herein is intended to mean homopolymers of vinylidene chloride and copolymers containing a major amount, i.e., 70 percent to 95 percent, and preferably 80 percent to 92 percent, of vinylidene chloride, and a minor amount, i.e., 5 percent to 30 percent, and preferably 8 percent to 20 percent, of at least one monomer copolymerizable with vinylidene chloride.

Representative monomers copolymerizable with vinylidene chloride include vinyl chloride, acrylonitrile, acrylic acid esters, methacrylic acid esters, maleic acid esters, fumaric acid esters, itaconic esters, the alcohol constituents of these esters containing one to six carbon atoms and preferably not more than four carbon atoms, methylvinyl ketone, vinyl acetate and other vinyl esters, styrene, dichlorovinylidene fluoride, butadiene, chlorobutadiene, isoprene, and vinylpyridine.

The term "polyolefin films" as used herein is intended to include polyethylene film, i.e., a film of a solid polymer of ethylene, polypropylene film, i.e., a film of a solid polymer of propylene, plastic films made of solid polymers of other olefins and plastic films of copolymers of these olefins, e.g., ethylene/propylene copolymers, ethylene/butene-1 copolymers. The term "polyolefin film" is also meant to encompass such polymers to which have been added modifiers such as stabilizers, slip agents, pigments, antistatic agents, antifog agents, in quantities conventionally employed for the intended purpose.

Butadiene/acrylonitrile copolymers useful in the practice of the present invention are copolymers of butadiene and acrylonitrile containing about 50 percent to about 70 percent by weight butadiene and about 30 percent to about 50 percent by weight acrylonitrile. These copolymers are well known to the art and are available commercially. Examples of butadiene/acrylonitrile copolymers which are available commercially and which have been found satisfactory for use in the practice of the present invention include "Hycar 1432" available from the B.F. Goodrich Chemical Company, which is a copolymer of about 67 percent butadiene and about 33 percent acrylonitrile, and "Paracril CV" and "Paracril D," which are butadiene/acrylonitrile copolymers containing about 50 percent to about 70 percent butadiene and about 30 percent to about 50 percent acrylonitrile, are available from the U.S. Rubber Company.

The epoxidized unsaturated oils which may be used in the practice of the present invention are oxirane containing fatty acyl derivatives, such as epoxidized linseed oil, epoxidized fish oils, and epoxidized soybean oil. These epoxidized oils have several oxirane groups in an internal open chain portion of the molecule and are substantially free of terminal oxirane groups.

The oxirane group is introduced by well-known methods into the fatty alkyl portion of the unsaturated fatty alkyl molecule across carbon-to-carbon linkages formerly occupied by unsaturated bonds. For example, the oils may be epoxidized by any of the conventional methods involving percarboxylic acids. Epoxidized linseed oil has an oxirane content of about 9 percent epoxidized safflower oil of about 7.5 percent, and epoxidized soybean oil of about 7 percent.

A preferred epoxidized unsaturated oil is epoxidized linseed oil. The epoxidized linseed oil may be represented as having the following formula:

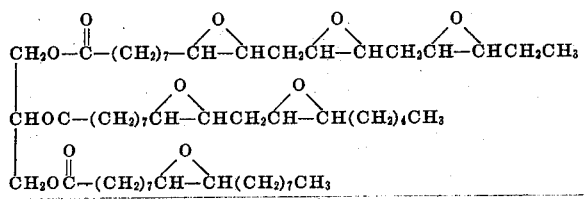

The epoxidized linseed oil is a highly reactive polyepoxide monomer containing on the average of 5.5 epoxy groups plus three reactive ester linkages per molecule.

Epoxidized linseed oil is obtainable commercially from Swift & Company under the tradename of EPOXOL 9-5. This epoxidized linseed oil has the following properties:

Equivalent weight/epoxy group....175 to 178
Equivalent weight/ester group....318 to 333
Molecular weight.................980 approx.
Oxirane content..................9 percent minimum
Iodine value.....................5 maximum
Gardner viscosity 25° C...880 cps.
Acid Number.....................0.3 maximum
Specific gravity................1.013 to 1.027

The polyisocyanates which can be used in the practice of the present invention include the aromatic aliphatic and cycloaliphatic isocyanates, and various mixtures thereof. Examples of these compounds include 2,4-toluene diisocyanate, 1,6-hexamethylene diisocyanate, 1,10-decamethylene diisocyanate, 4-chloro-1,3-phenylene diisocyanate, 4- ethoxy-1,3-phenylene diisocyanate, 5,6-dimethyl-1,3-phenylene diisocyanate, 4,4-diisocyanate-2,5-fluorene diisocyanate, 1,8-naphthalene diisocyanate, 2,4,6-toluene triisocyanate, 2,6-toluene diisocyanate, p-phenylene diisocyanate, 4,4-diphenylene methane diisocyanate, hexamethylene diisocyanate, 2-nitro-4,4-phenylene diisocyanate, mixtures of 2,4-toluene diisocyanate and 2,6-toluene diisocyanate, 1,3,6-hexane triisocyanate, 1,4-cyclohexyl diisocyanate, 1,3,5-cyclohexane triisocyanate, xylene diisocyanate, heterocyclic polyisocyanates, e.g., furfurylidene diisocyanate, naphthalene-1,5-diisocyanate, 3,3-dimethoxy diphenyl methane-4,4-diisocyanate, diphenyl methane-4,4-diisocyanate, and 2,6-diethyl benzene-1,4-diisocyanate.

Of the polyisocyanates, the arylene diisocyanates which have two isocyanate groups attached directly an aromatic ring are preferred.

To maximize the bonding effectiveness of the vinylidene chloride polymer composition of the present invention to the polyolefin ply of the laminate, it is desirable to pretreat the polyolefin film by surface oxidation or electrical discharge treatment, such as exposure to an open flame, chemical oxidation and other similar methods, corona and glow discharge, prior to contacting the polyolefin film with the vinylidene coating.

In carrying out the surface pretreatment, high-frequency electrical discharge treatment of the film surface is preferred. This technique is known to the art, and a suitable example of an electrical discharge treatment of the film which may be employed is exemplified by the teachings of U.S. Pat. Nos. 2,939,956 and 3,081,214.

The coating compositions of the present invention can be applied to the film surfaces which make up the laminate structure by any conventional procedure, but it is preferred to apply the coating composition as a solution in a volatile organic solvent. In preparing the coating solution of the present invention, the vinylidene chloride polymer, butadiene/acrylonitrile copolymer and the epoxidized unsaturated oil are dissolved in a volatile organic solvent such as methyl ethyl ketone and tetrahydrofuran. Stable solutions of vinylidene chloride polymers may also be prepared by mixing methyl ethyl ketone with another volatile solvent, such as acetone, ethyl acetate, toluene, methanol, methylene chloride, or propylene oxide. In a separate solution of the same solvent are dissolved the polyisocyanate and the catalyst. Suitable catalysts include free radical producing compounds such as azo catalysts, as α, α-azobis-isobutyronitrile, and peroxygen-type catalysts such as diethylperoxide, ditertiary butyl peroxide, persuccinic acid and lauroyl hydroperoxide and methyl ethyl ketone peroxide.

When the coating is to be applied to the film substrate, the separate solutions are mixed and may be applied to the substrate in any conventional manner as by dipping, spraying, brushing, rolling, doctoring, and the like.

In preparing the coating solution, the present solids in the solution may vary from about 10 percent to about 25 percent.

In preparing polyolefin/polyethylene terephthalate film laminates suitable for packaging foodstuffs, the coating compositions of the present invention preferably contain about 85 percent to about 95 percent by weight of the vinylidene chloride polymer, about 1.7 to about 5.8 percent by weight of the butadiene/acrylonitrile copolymer, about 1.7 to about 5.8 percent by weight of the epoxidized unsaturated oil, and about 1.1 to about 3.4 percent by weight of the organic polyisocyanate. To accelerate the rate of curing of the coating, the catalyst is present in the coating composition in an amount ranging from about 0.04 to about 0.12 percent by weight.

After the application of the coating solution to the film substrate, the film is passed through a suitable drying oven to remove the solvent. When the coating solution is to be applied to a polyethylene terephthalate substrate, it has been found particularly expedient that simultaneous with the drying of the coating solution on the polyethylene terephthalate substrate, the surface of polyolefin film to be joined to the coated polyethylene terephthalate surface be oxidized or otherwise pretreated, and the coated ply and the pretreated ply be then immediately assembled together.

Temperatures which can be employed for drying the coated film may be in the range of 70° F, to 160° F, or higher if desired.

When the coating solution is applied to a polyethylene terephthalate film surface, it is preferably applied at a rate of about 0.3 to about 1.2 pounds of coating composition per 1,000 ft.$^2$ of polyethylene terephthalate surface, and preferably at about 0.4 to 0.6 pounds per 1,000 ft.$^2$ of polyethylene terephthalate surface.

The following example will further illustrate the invention, but the invention is not restricted to this example.

EXAMPLE

An adhesive coating for laminating a polyethylene film to a polyethylene terephthalate film was prepared by first dissolving Saran F310, a vinylidene chloride copolymer containing a minor amount of acrylonitrile, a product of the Dow Chemical Company, Paracril CV, a butadiene/acrylonitrile copolymer, a product of the U.S. Rubber Company, containing 70 percent butadiene and 30 percent acrylonitrile, and an epoxidized linseed oil (Epoxol 9—5) to obtain a first coating solution using 2,000 parts methyl ethyl ketone as the solvent. A second solution containing 2,4-toluene diisocyanate and α, α-azobisisobutynitrile dissolved in 400 parts methyl ethyl ketone was prepared and mixed with the first solution immediately before application to one side of a polyethylene terephthalate film having a thickness of 0.5 mils. The proportions of the coating composition components are recorded in the table below. The mixed coating solution was applied at a rate of 0.4 pounds of coating solids per 1,000 square feet of film surface area. The methyl ethyl ketone solvent was evaporated from the applied coating by passing the coated film through a forced draft oven maintained at 120° to 160° F. Simultaneous with the drying of the coated film, one side of a polyethylene film having a thickness of 1.5 mils was exposed to glow discharge pretreatment. The two films were assembled together so that the coated side of the polyethylene terephthalate film was bonded to the glow discharge treated side of the polyethylene film. The assembly was then rolled tightly to form a laminated sheet which was then aged at 130° F. for 3 days to complete the cure of the coating.

The resistance of the laminated sheet to delamination or peel strength at ambient conditions and exposure to boiling water for 5 minutes was determined by measuring the bond strength between the vinylidene chloride polymer-coated polyethylene terephthalate layer and the polyethylene layer of the laminate by pulling the bonded layers apart at an angle of 180° to the bond in the opposing jaws of a Suter tensile testing device at the rate of 20.0 inches per minutes using test strips 1-inch wide which had been cut out of the laminate.

A laminate having a peel strength less than 300 gm./in. width is considered unsuitable for packaging applications.

The oxygen transmission value (cc./100 in.$^2$/24 hours/0.1 mil thickness) of the laminate was measured by ASTM Method No. D-1434-58 . In order to meet the requirements of the food industry, the packing film should have a gas transmission value less than 4.5 cc./100 in.$^2$ / 24 hours/0.1 mil thickness.

The peel strength and oxygen transmission value of the so prepared laminate is summarized in the table below (Run No. 1).

For purposes of comparison, the peel strength and oxygen transmission values of laminated sheets prepared in a manner similar to the example with the exception that the polyethylene terephthalate film was coated with a vinylidene chloride polymer coating having a composition outside the scope of the present invention prior to lamination with the polyethylene film were also determined.

The peel strength and oxygen transmission values of these laminates are summarized in the table below (Run Nos. $C_1$ to $C_7$).

By comparing the properties of polyethylene/polyethylene terephthalate film laminates bonded together with a vinylidene chloride polymer containing composition in accordance with the present invention (Run No. 1 of the table), with similar laminates bonded together with vinylidene chloride polymer containing compositions outside the scope of the present invention (Run Nos. $C_1$ –$C_7$) it is immediately apparent that the laminates prepared in accordance with the present invention have substantially improved peel strengths and low gas transmission values.

What is claimed is:

1. A coating composition which has low gas transmission properties and is strongly adherent to thermoplastic film materials which comprises a solution in a volatile organic solvent of a mixture of nonvolatile constituents comprised of about 85 to about 95 percent by weight of a vinylidene chloride polymer selected from the group consisting of vinylidene chloride homopolymers and vinylidene chloride copolymers containing 70 degrees to 95 degrees by weight vinylidene chloride and 30 degrees to 5 degrees of a monomer copolymerizable therewith, about 1.7 to about 5.8 percent by weight of a butadiene/acrylonitrile copolymer containing about 50 percent to about 70 percent by weight butadiene and about 30 percent to about 50 percent by weight acrylonitrile, about 1.7 percent to about 5.8 percent by weight of an epoxidized naturally occurring unsaturated oil, about 1.1 percent to 3.4 percent by weight of an organic polyisocyanate and about 0.04 to about 0.12 percent by weight of a free-radical producing catalyst.

2. The composition of claim 1 wherein the vinylidene chloride polymer is a copolymer of vinylidene chloride and acrylonitrile.

3. The coating composition of claim 1 wherein the epoxidized unsaturated oil is an epoxidized linseed oil.

4. The coating composition of claim 3 wherein the epoxidized linseed oil has an oxirane content of about 9 percent.

5. The coating composition of claim 1 wherein the polyisocyanate is 2,4-toluene diisocyanate.

6. The coating composition of claim 1 wherein the catalyst is $\alpha$ , $\alpha$ -azobisisobutyronitrile.

* * * * *

| | Vinylidene chloride polymer coating composition | | | | Properties of laminated film | | | | |
|---|---|---|---|---|---|---|---|---|---|
| | Vinylidene chloride polymer (weight percent) | Butadiene/ acrylonitrile copolymer (weight percent) | Epoxol 9-5 (weight percent) | 2,4-toluene diisocyanate (weight percent) | Catalyst (weight percent) | Peel strength, grams/inch width | Boiling water resistance | | Oxygen transmission value |
| | | | | | | | Peel strength, grams/inch width | Optical properties | |
| Run Number: | | | | | | | | | |
| 1 | 90 | 3.8 | 3.8 | 2.3 | 0.08 | [1] 850+ | 850+ | Clear | 2.34 |
| $C_1$ | 100 | | | | | <50 | <50 | do | 2.10 |
| $C_2$ | 80 | 20 | | | [2] 1 | Pulls apart by hand with difficulty. | Pulls apart by hand easily. | do | [4] nd |
| $C_3$ | 75 | 9.6 | 9.6 | 5.6 | 0.2 | 850+ | 850+ | do | 5.40 |
| $C_4$ | 67 | | 33 | | [3] 1 | Pulls apart by hand very easily. | Pulls apart by hand very easily. | Hazy | nd |
| $C_5$ | 66 | 17 | 17 | | | Pulls apart by hand with difficulty. | Pulls apart by hand easily. | Clear | nd |
| $C_6$ | 60 | 8 | 16 | 16 | | do | ([1]) | do | nd |
| $C_7$ | 59 | 14.5 | 14.5 | 11.5 | [5] 0.6 | 850+ | 850+ | do | 5.80 |

[1] Polyethylene film tore indicating bond stronger than film, i.e., adhesion greater than film cohesion.
[2] Dicumyl peroxide.
[3] Zinc chloride.
[4] Not determined.
[5] Benzoyl peroxide.